United States Patent
Kozuka

(10) Patent No.: US 8,780,372 B2
(45) Date of Patent: Jul. 15, 2014

(54) IMAGE PROCESSING APPARATUS AND IMAGE PROCESSING METHOD TO READ AND PREVENT LOSS OF CODED INFORMATION

(75) Inventor: Yasuhiro Kozuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 598 days.

(21) Appl. No.: 12/395,278

(22) Filed: Feb. 27, 2009

(65) Prior Publication Data

US 2009/0219561 A1 Sep. 3, 2009

(30) Foreign Application Priority Data

Feb. 28, 2008 (JP) .................................. 2008-048098

(51) Int. Cl.
*G06K 15/00* (2006.01)

(52) U.S. Cl.
USPC ........................................................ 358/1.14

(58) Field of Classification Search
USPC ................. 358/1.1, 1.13, 1.14, 1.15; 382/306
See application file for complete search history.

(56) References Cited

U.S. PATENT DOCUMENTS

| | | | |
|---|---|---|---|
| 2003/0037010 A1* | 2/2003 | Schmelzer | 705/67 |
| 2003/0164978 A1* | 9/2003 | Song | 358/1.18 |
| 2003/0179399 A1 | 9/2003 | Matsunoshita | |
| 2003/0231785 A1* | 12/2003 | Rhoads et al. | 382/100 |
| 2005/0091268 A1* | 4/2005 | Meyer et al. | 707/103 R |
| 2005/0168769 A1* | 8/2005 | Kim et al. | 358/1.14 |
| 2005/0243355 A1* | 11/2005 | Foehr et al. | 358/1.13 |
| 2005/0276520 A1* | 12/2005 | Leslie et al. | 382/306 |
| 2007/0263241 A1* | 11/2007 | Nakayama | 358/1.13 |
| 2007/0297013 A1* | 12/2007 | Nakagawa | 358/3.28 |

FOREIGN PATENT DOCUMENTS

| | | |
|---|---|---|
| JP | 2003-280469 | 10/2003 |
| JP | 2004-112650 A | 4/2004 |
| JP | 2005-175773 A | 6/2005 |
| JP | 2007-166218 A | 6/2007 |

* cited by examiner

*Primary Examiner* — Jeremiah Bryar
(74) *Attorney, Agent, or Firm* — Canon USA Inc. IP Division

(57) ABSTRACT

An image processing apparatus reads an original to which a restriction item such as copy restriction is embed to input image data. The image processing apparatus restricts an image processing on the input image data which involves a loss of the embedded information on the restriction item to maintain a state where the restriction item is embedded for the output. Alternatively, the image processing apparatus outputs the image data of a format where the restriction information is added to the input electric data.

17 Claims, 9 Drawing Sheets

010, 111, 110, 011 = 2, 7, 6, 3

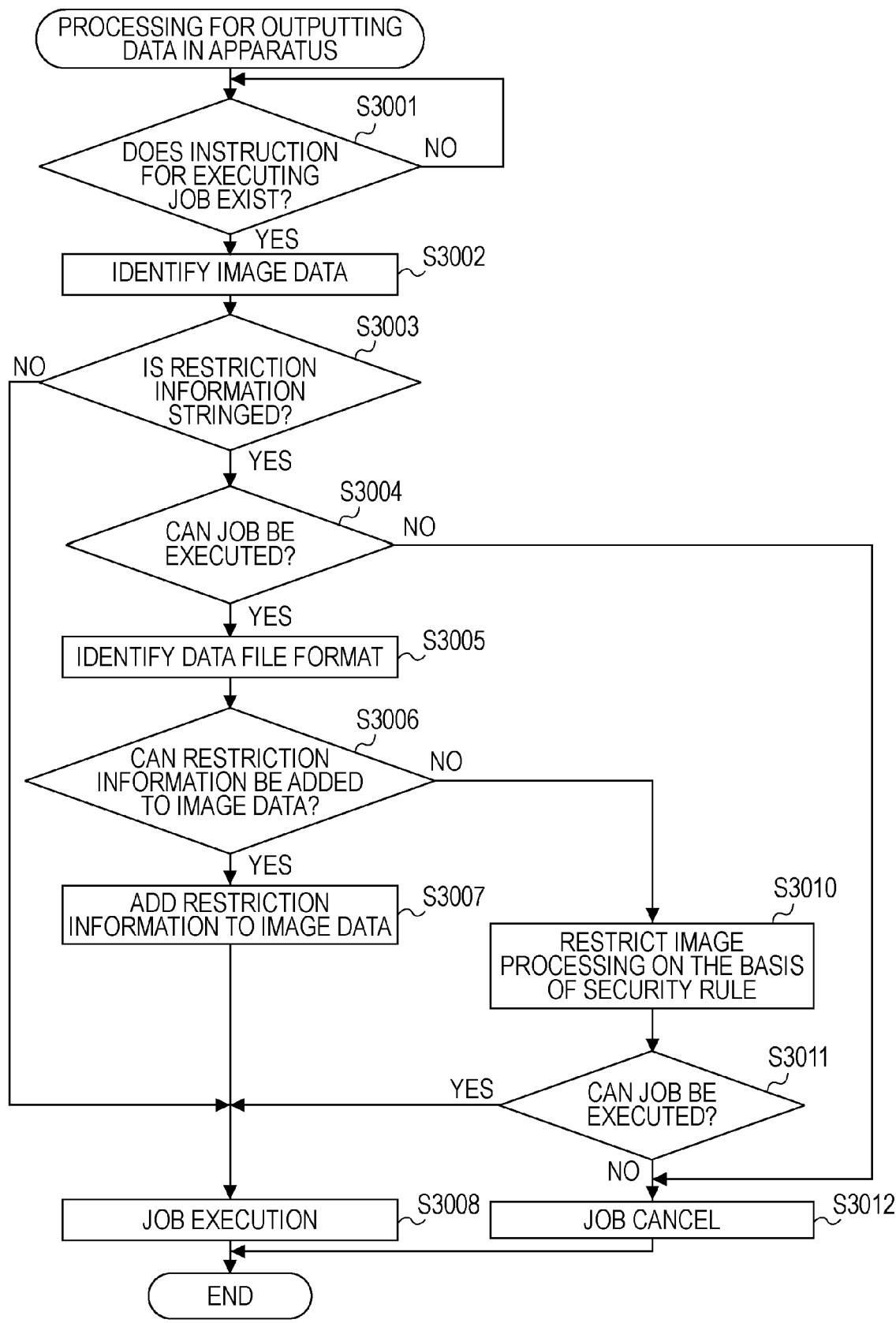

IMAGE PROCESSING APPARATUS AND IMAGE PROCESSING METHOD TO READ AND PREVENT LOSS OF CODED INFORMATION

BACKGROUND OF THE INVENTION

1. Field of the Invention

The present invention relates to an image processing apparatus and method arranged to read coded information, more specifically, preventing loss of the coded information.

2. Description of the Related Art

In recent years, along with a development in information technology for office environments, security issues draw more attention. For example, if customer information held by a company is leaked out, privacy of individuals may be threatened, which becomes a large social problem.

In general, in order to cope with these problems, for example, such a method is adopted for preventing the leakage that only persons having an access right can access computerized classified information. Also, such a measure is employed that a monitoring apparatus or the like is provided to a firewall of a personal computer (PC) which is connected to the internet to prevent the classified computerized information from being leaked to the outside of the company. In this manner, in the case of the classified computerized information, the monitoring policy is decided in the above-described manner and executed so that the classified information can be guarded.

On the other hand, in a case where the classified information is printed on sheet medium by an image forming apparatus or the like, it is difficult to check or restrict bringing-out of the sheet on which the classified information (classified information on organizations and private information on individuals) is printed to the outside of the company. For this reason, a restriction on bringing-out of the sheet on which the classified information is printed is more difficult than a restriction on bringing-out of the classified computerized information, which causes difficulty in maintenance of the security.

In recent years, by utilizing a digital watermark technology or an information embedding technology based on a two-dimensional barcode or the like, at the time of the printing, in addition to the main image, a technology is used for embedding information other than the image to the sheet medium itself. As an example of a method of utilizing such embedded information, the following use case is conceivable. For example, in a case where the image is printed, information on a user who has printed the image or the like is embedded as the information other than the image. In a case where the image is the classified information, it is possible to identify the user who has printed the classified information on the basis of the embedded information. Therefore, in a case where the information is leaked out without discretion as the print output of the classified image is brought out, the person who has leaked the information is accused on the basis of tracking information, and it is thus possible to expect a deterrent effect for the information leakage.

In addition, as another use case of the embedded information, such a system is proposed that by using the digital watermark technology or the two-dimensional barcode technology in the related art, when the printing is executed, copy restriction information is embedded to the sheet medium itself. In this system, when the original to which the copy restriction information is embedded is copied by the image forming apparatus, the copy restriction information is extracted to detect whether the copying is allowed or restricted, and a control regarding continuation or aborting of the copy is performed for each page. Furthermore, in this system, password information and permitted user information are embedded as condition information to only allow particular users to perform the copying (for example, see Japanese Patent Laid-Open No. 2003-280469). The above-described use case of the embedded information is for preventing the leakage of the classified image, that is, for the security. It is noted that the embedded information may be used for purposes other than the security.

However, for example, in the image forming apparatus, in a case where image data obtained by scanning the original to which the information is embedded is subjected to an image processing of degrading the resolution or the like, the embedded information may be lost (unusable). In a case where the image data whose embedded information is lost is sent to another image processing apparatus or the like, the image without the embedded information is output by the image processing apparatus at the sending destination. For example, in a case where the embedded information is used for the above-described security reason, the loss of the embedded information may be a factor of a security hole.

SUMMARY OF THE INVENTION

According to an embodiment of the present invention, computerized data obtained by reading an original in which a restriction item such as copy restriction is embedded is stored. An embodiment of present invention provides an image processing apparatus and an image processing method with which this stored data is output while a state where the restriction item is embedded is maintained or a state where the information on the restriction item is added is established, and the embedded information is not lost.

According to an embodiment of the present invention, there is provided an image processing apparatus including: an image input unit configured to input image data; an image processing unit configured to perform an image processing on the image data; a detection unit configured to detect embedded information from the image data; and a restriction unit configured to restrict an execution of an image processing involving a loss of the embedded information from the image data to be performed by the image processing unit in a case where the detection unit detects the embedded information from the image data.

According to an embodiment of the present invention, there is provided an image processing method in an image processing apparatus, the method including: inputting image data; detecting embedded information from the image data; and restricting an execution of an image processing involving the loss of embedded information from the image data in a case the where embedded information is detected from the image data.

Further features of the present invention will become apparent from the following description of exemplary embodiments with reference to the attached drawings.

BRIEF DESCRIPTION OF THE DRAWINGS

FIG. 11 is a flowchart exemplifying an execution procedure of a job based on the image data in which the coded information such as a restriction item or the like for security is stringed to image information.

DESCRIPTION OF THE EMBODIMENTS

Figure 1:
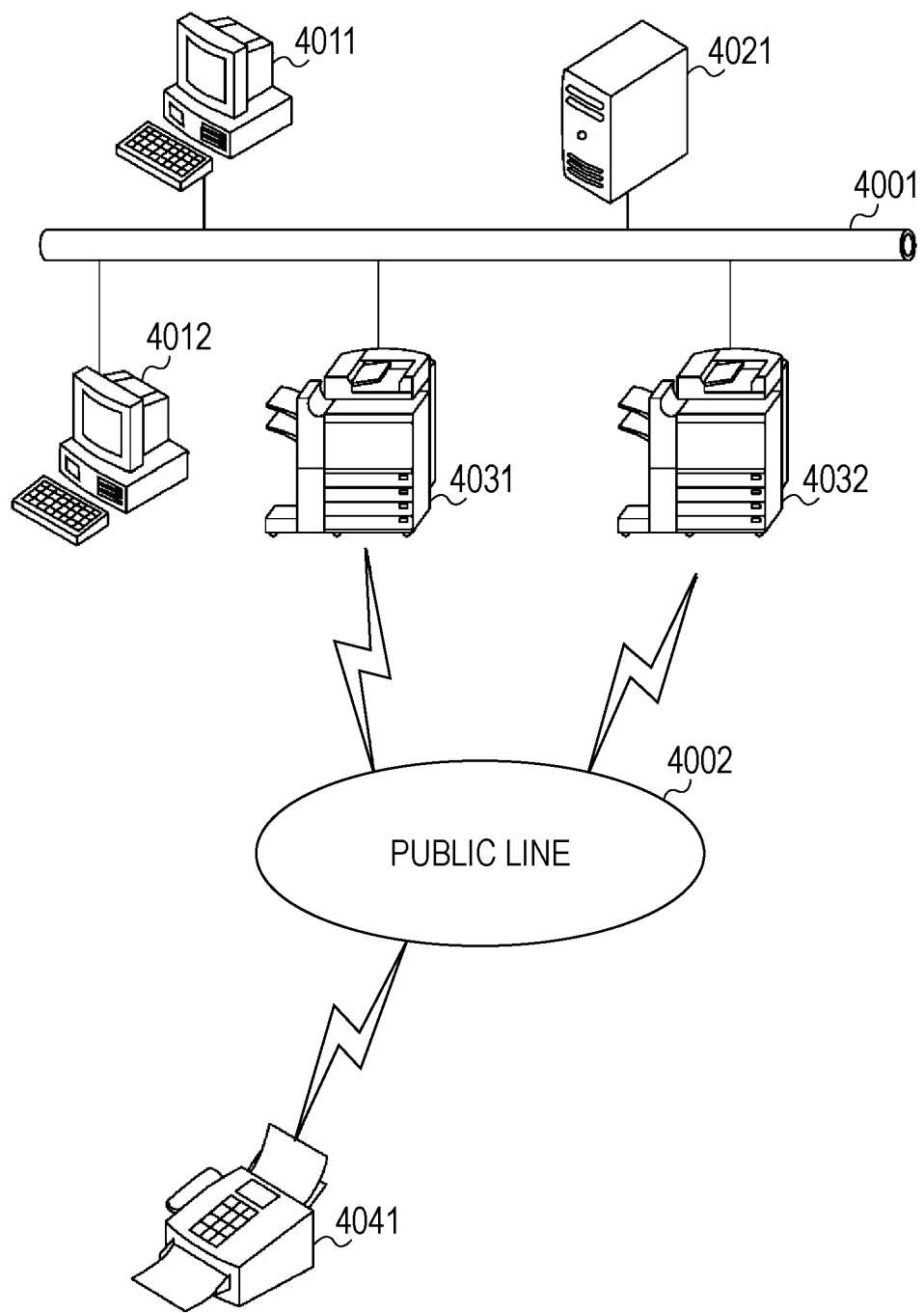
FIG. 1 is an explanatory diagram for an entire schematic configuration of a network system provided with an image processing apparatus according to an embodiment of the present invention.

Hereinafter, embodiments of the present invention will be described with reference to the drawings. FIG. 1 is an explanatory diagram for an entire schematic configuration of a network system provided with an image processing apparatus according to an embodiment of the present invention.

As illustrated in FIG. 1, a network system according to the present embodiment is provided with client PCs 4011 and 4012, a print server 4021, and image forming apparatuses 4031 and 4032. Furthermore, these apparatuses are mutually connected via the LAN 4001, and have a function of performing a communication via the LAN 4001.

The image forming apparatuses 4031 and 4032 in this network system have both a copy function and a printer function. Furthermore, the image forming apparatuses 4031 and 4032 is connected via a public line 4002 to a facsimile (FAX) apparatus 4041 and the like. That is, the image forming apparatuses 4031 and 4032 have a function (fax function) of sending computerized data of a document via the public line 4002 to the facsimile (FAX) apparatus 4041. Also, the image forming apparatuses 4031 and 4032 a function (send function) of sending the computerized data of the document via the LAN 4001 to an apparatus which is connected to the LAN 4001.

In a case where a print operation is performed in this system, for example, a user sends print data created by operating the client PC 4011 or 4012 to the print server 4021 via the LAN 4001. The print server 4021 sends the received print data to the image forming apparatus 4031 or 4032 again. In the image forming apparatus 4031 or 4032, the received print data is analyzed to be converted into an image, and the image is printed (or output) on paper, so that a printed material is generated.

It is noted that in this network system, the print server 4021 may be omitted to configure the system. In that case, the client PCs 4011 and 4012 are configured to send the print data directly to the image forming apparatus 4031 or 4032.

Next, the image forming apparatuses 4031 and 4032 will be described. The image forming apparatuses 4031 and 4032 are provided with a scanner unit, a controller, and a printer unit which are not shown. This scanner unit inputs reflection light obtained by performing exposure scanning on the image on the original to a CCD to convert information of the image into an electric signal. The scanner unit converts the electric signal into luminance signals of respective colors R, G, and B. Then, the scanner unit outputs this luminance signal to the controller as the image data. The controller sends the image data to the printer unit and controls the printer unit to form the image on a sheet. It is noted that the printer unit is configured as an image forming device which is generally used. An image forming system of the printer unit is not limited to an electrophotography system using a photosensitive drum and a photosensitive belt. For example, an ink jet system may be used in which ink is ejected from a fine nozzle array to perform the printing on the sheet.

Next, the above-described controller of the image forming apparatuses 4031 and 4032 will be described in more detail with reference to FIG. 2.

Figure 2:
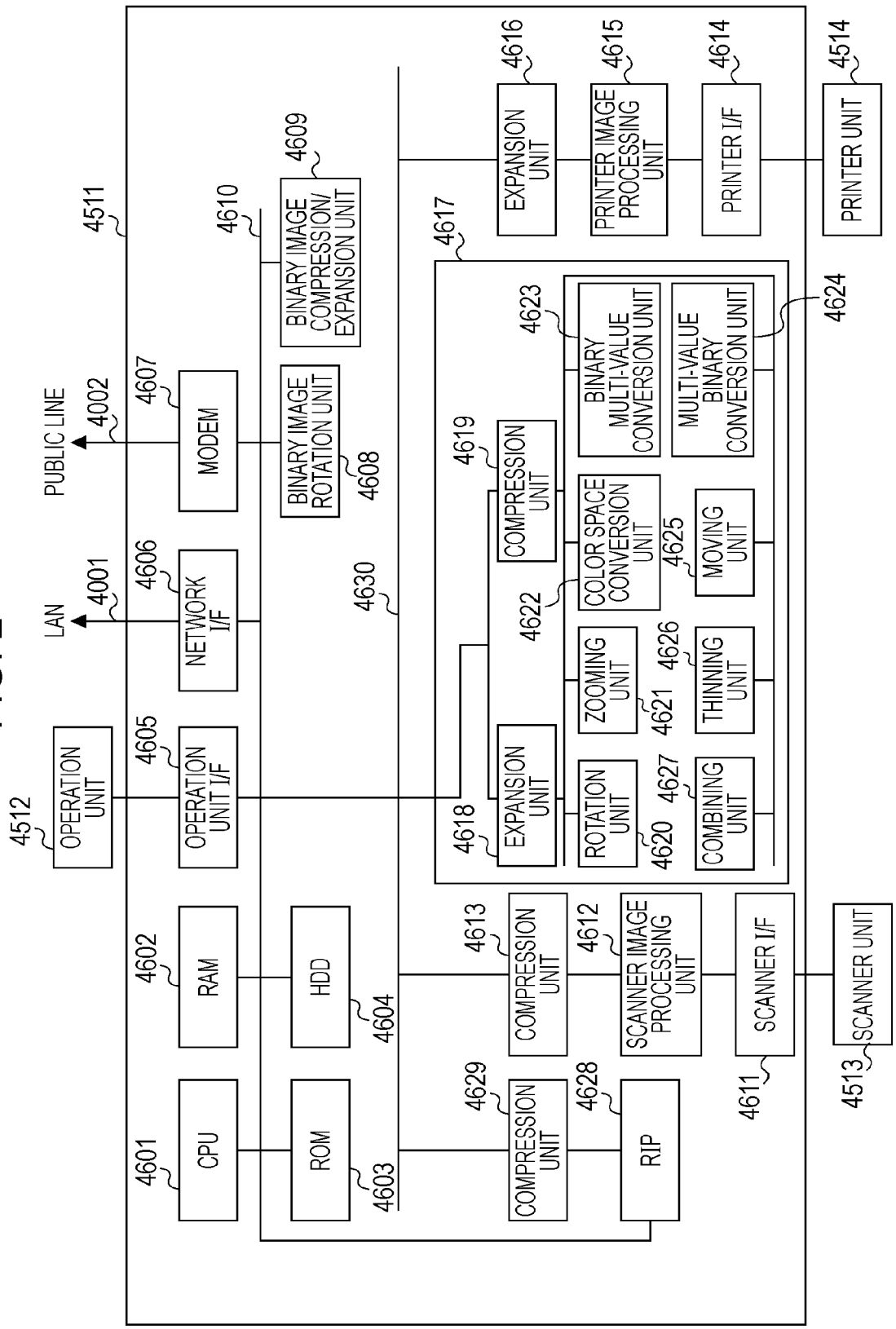
FIG. 2 is a block diagram of a configuration of a controller in an image forming apparatus illustrated in FIG. 1.

FIG. 2 is a block diagram illustrating a configuration of a controller 4511 of the image forming apparatuses 4031 and 4032. The controller 4511 is electrically connected to a scanner unit 4513 or a printer unit 4514 which is an example of an image input device arranged to input the original image. On the other hand, the controller 4511 is connected to the print server 4021, an external apparatus, and the like via the LAN 4001 and the public line 4002. With this configuration, the controller 4511 can input and output the image data and the device information.

The controller 4511 is provided with a CPU (control unit) 4601. The CPU 4601 controls accesses of various devices in connection on the basis of a control program or the like stored on a ROM 4603 on an overall manner. Along with this, the CPU 4601 also controls various processings performed inside the controller on an overall manner.

A RAM 4602 is connected to a system bus 4610. The RAM 4602 functions as a system work memory and also as a memory for temporarily storing the image data. The RAM 4602 is composed of an SRAM which holds the stored content even after turning off of the power source and a DRAM where the stored content is deleted after the power source is turned off. Also, the ROM 4603 stores a boot program of the apparatus, and the like. The HDD 4604 is a hard disk drive and is configured to be able to store system software and the image data.

To the system bus 4610 of the controller 4511, an operation unit 4512 is connected via an operation unit I/F 4605 (interface unit). The operation unit 4512 is composed of a hard key such as a push button, a touch panel LCD, and the like and is configured to accept an operation instruction from the user.

The operation unit I/F 4605 receives the image data from the system bus 4610 for displaying the image data on the operation unit 4512 and outputs the image data to the operation unit 4512. Also, the operation unit I/F 4605 outputs the information input from the operation unit 4512 to the system bus 4610.

As illustrated in FIG. 2, a network I/F 4606 is connected to the LAN 4001 and the system bus 4610 and is configured to input and output the information. A modem 4607 is connected to the public line 4002 and the system bus 4610 and performs input and output of information. A binary image rotation unit 4608 converts the direction of the image data before sending the image data. A binary image compression/expansion unit 4609 converts the resolution of the image data before the sending into a predetermined resolution or a resolution in accordance with a performance with the other side. It is noted that for performing the compression and the expansion, a system of JBIG, MMR, MR, MH, or the like is used. An image bus 4630 is a transmission path for exchanging the image data and is composed of a PCI bus or IEEE1394.

In addition, a scanner image processing unit 4612 performs a correction, a process, and an editing on the image data received from the scanner unit 4513 via a scanner I/F 4611. It is noted that the scanner image processing unit 4612 determines whether the received image data is a color original or a black and white original, a character original or a photograph original, and the like. Then, the determination result is attached to the image data. Such attached information is referred to as attribute data.

A compression unit 4613 receives the image data and divides this image data in units of blocks of 32×32 pixels. It is noted that this image data of 32×32 pixels is referred to as tile data. Also, in the original (paper medium before the reading), an area corresponding to this tile data is referred to as tile image. Also, the tile data is added with average luminance information in the blocks of 32×32 pixels and coordinate positions on the original of the tile image as header information.

Furthermore, the compression unit 4613 performs the compression on the image data composed of plural pieces of the tile data. An expansion unit 4616 expands the image data composed of the plural pieces of the tile data and performs raster expansion to be sent to a printer image processing unit 4615.

The printer image processing unit 4615 receives the image data sent from the expansion unit 4616 and applies the image processing on the image data while referring to the attribute data attached to the image data. The image data after the image processing is output via a printer I/F 4614 to the printer unit 4514.

An image conversion unit 4617 applies a predetermined conversion processing on the image data. This processing unit is composed of the processing unit which will be described below.

An expansion unit 4618 of the image conversion unit expands the received image data. A compression unit compresses the received image data. A rotation unit rotates the received image data. A zooming unit 4621 performs a resolution conversion processing (for example, 600 dpi to 200 dpi) on the received image data. A color space conversion unit 4622 converts the color space of the received image data. The color space conversion unit 4622 can perform a background removing processing in a related art by using a matrix or a table, a LOG conversion processing (RGB→CMY) in a related art, or an output color correction processing (CMY→CMYK) in a related art.

A binary multi-value conversion unit 4623 converts the received image data of two tones into the image data of 256 tones. In contrast, a multi-value binary conversion unit 4624 converts the received image data of the 256 tones through a method based on an error diffusion processing into the image data of the two tones.

A combining unit 4627 combines the two pieces of the received image data into one image data. It is noted that when the two pieces of image data are combined, a method of setting an average value of the luminance values of the pixels of the combination targets as a combination luminance value or a method of setting the luminance value of the pixel which is brighter than the other one at the luminance level as the luminance values of the pixels after the combination is adopted. Also, a method of setting the luminance value of the pixel which is darker than the other one as the luminance values of the pixels after the combination may also be employed. Furthermore, a method of deciding the luminance value through an OR operation, an AND operation, a logical exclusive OR operation, or the like on the pixels of the combination targets or the like can also be applied. These combination methods are disclosed in a related art. A thinning unit 4626 thins out of the pixels of the received image data to perform a resolution conversion to generate the image data of ½, ¼, ⅛, or the like. A moving unit 4625 adds a margin part to the received image data or eliminates the margin part.

In addition, an RIP 4628 receives intermediate data generated on the basis of PDL code data sent from the print server 4021 or the like and generates bitmap data (multi-value). A compression unit 4629 compresses the received image data.

Figure 3:
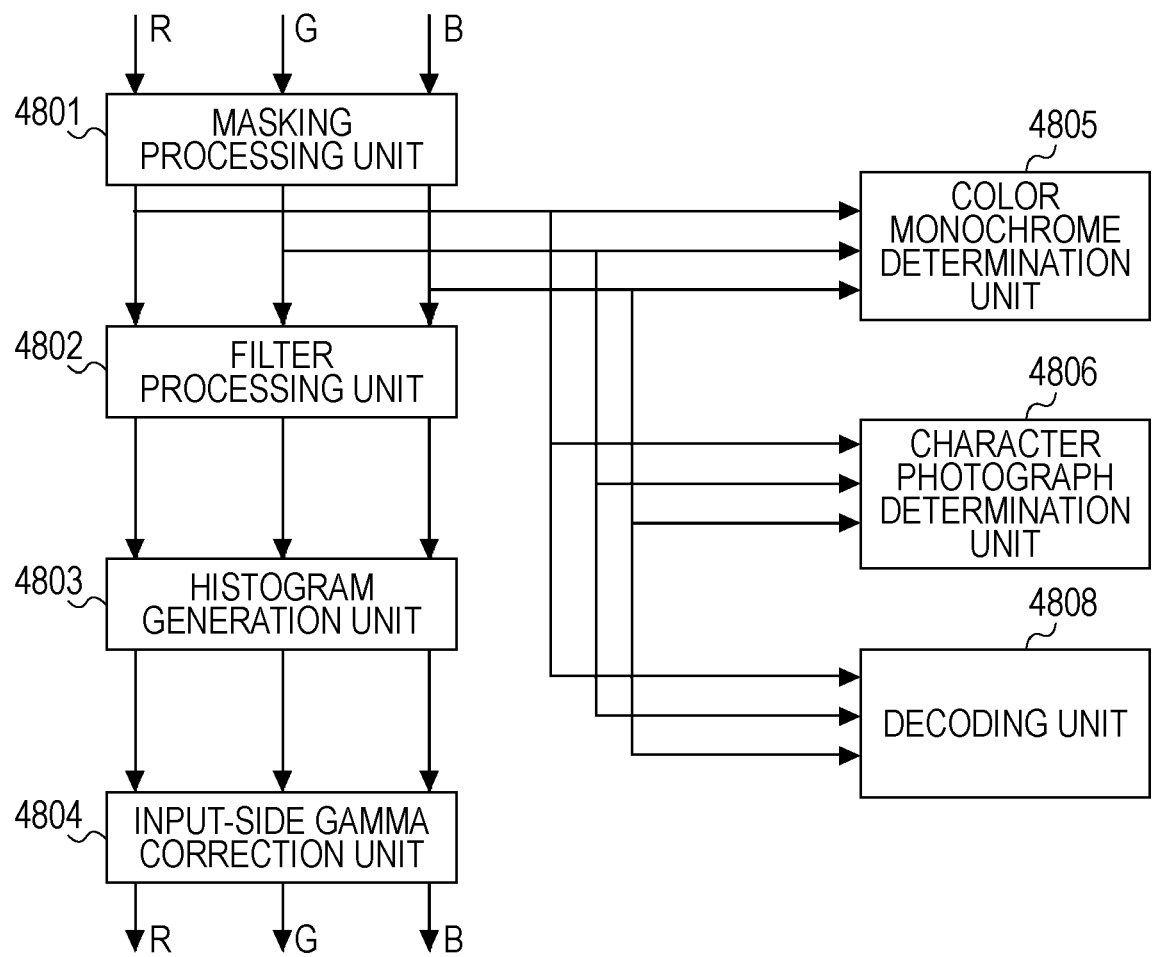
FIG. 3 is a block diagram of a configuration of a schematic configuration of a module in a scanner image processing unit illustrated in FIG. 2.

Next, a detail of the scanner image processing unit 4612 will be described with reference to FIG. 3. FIG. 3 is a block diagram of a schematic configuration of a module in the scanner image processing unit 4612.

The scanner image processing unit 4612 receives the image data composed of luminance signals of 8 bits in RGB, respectively. This luminance signal is converted into a standard luminance signal which does not rely on a filter color of a CCD by a masking processing unit 4801. A filter processing unit 4802 arbitrarily corrects a space frequency of the received image data. The filter processing unit 4802 performs an arithmetic processing by using a matrix, for example, of 7×7 on the received image data.

In the image forming apparatuses 4031 and 4032, while the user operates the operation unit 4512, it is possible to select a character mode, a photograph mode, or a character/photograph mode as a copy mode. At this time, in a case where the user selects the character mode, the filter processing unit 4802 applies a filter for the character on the entire image data. Also, in a case where the user selects the photograph mode, the filter processing unit 4802 applies a filter for the photograph on the entire image data. Then, in a case where the user selects the character/photograph mode, in accordance with the character photograph determination signal (a part of the attribute data), the filters are appropriately switched over for each pixel. That is, the filter for the photograph or the filter for the character is decided for each pixel.

It is noted that a coefficient for only smoothing the high frequency component is set in the filter for the photograph. This is because roughness of the image is set inconspicuous. Also, a coefficient for performing a slightly enhanced edge emphasis is set in the filter for the character. This is because sharpness of the character is developed.

A histogram generation unit 4803 samples luminance data of the respective pixels constituting the received image data. To described in more detail, the histogram generation unit 4803 samples the luminance data surrounded by starting points and ending points respectively in a main scanning direction and a sub scanning direction in the rectangular area in the main scanning direction and the sub scanning direction at a constant pitch. Then, the histogram generation unit 4803 generates histogram data on the basis of the sampling result. The thus generated histogram data is used for estimating the background level when the background removing processing is performed. An input-side gamma correction unit 4804 converts the luminance data having a nonlinear characteristic by utilizing the table or the like.

A color monochrome determination unit 4805 determines whether the respective pixels constituting the received image data have a chromatic color or an achromatic color, and attaches the determination result to the image data as color monochrome determination signal (a part of the attribute data).

A character photograph determination unit 4806 determines whether the respective pixels constituting the image data are pixels constituting characters, pixels constituting halftone dots, pixels constituting characters in the halftone dots, or pixels constituting a solid image. The determination performed by the character photograph determination unit 4806 is based on the pixel values of the respective pixels and the pixel values of pixels in the vicinity of the respective pixels. It is noted that pixels which are not applicable in this determination are pixels constituting a white area. The determination result of the character photograph determination unit 4806 is attached to the image data as the character photograph determination signal (a part of the attribute data).

In a case where the encoded image data output from the masking processing unit 4801 exists in the image data, a decoding unit 4808 detects the presence of the encoded image data. Then, the decoding unit 4808 decodes the detected encoded image data and takes out the information.

Figure 4:
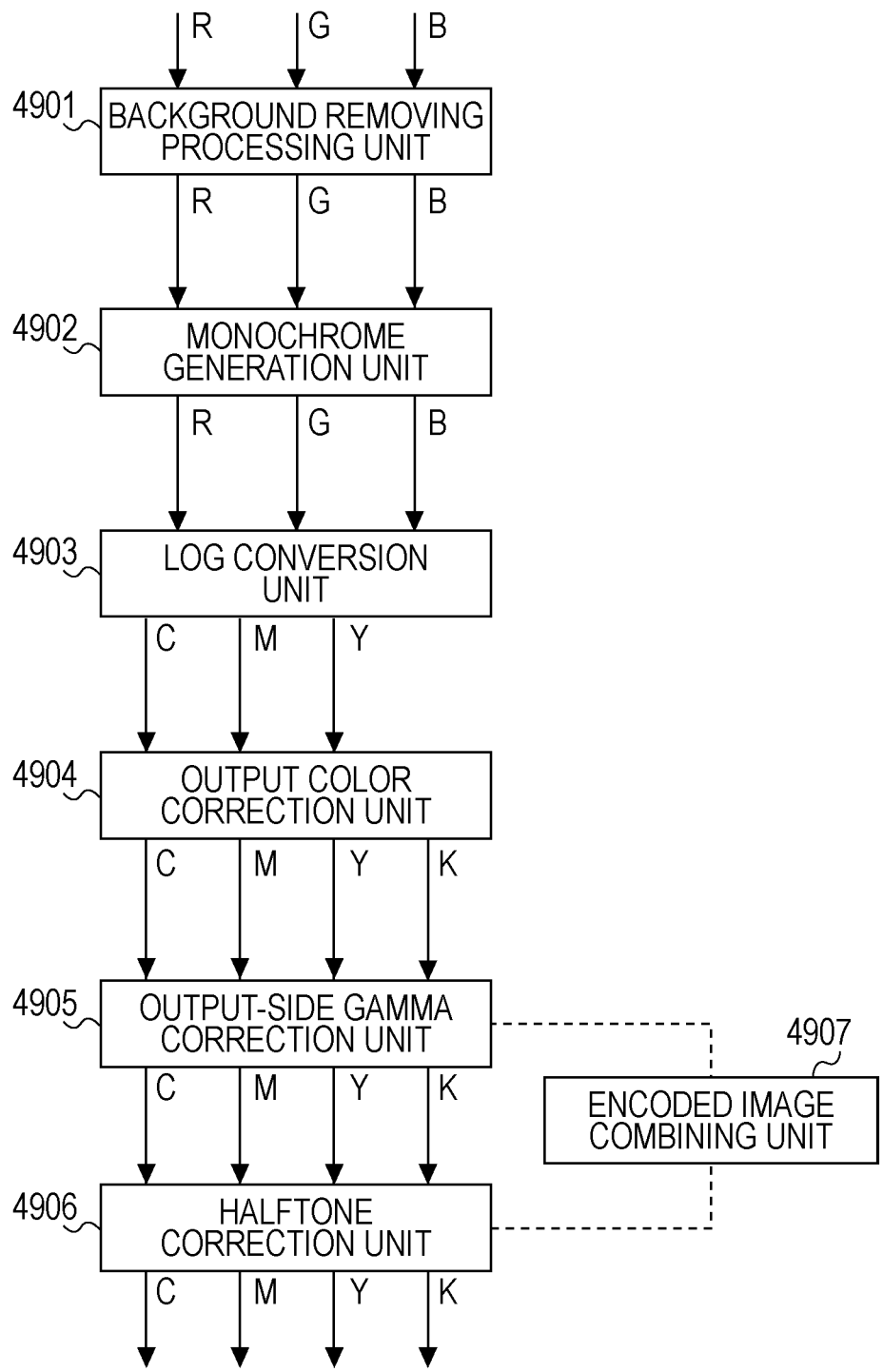
FIG. 4 is an explanatory diagram for explaining a flow of a processing performed in a printer image processing unit illustrated in FIG. 2.

Next, a detail of the printer image processing unit 4615 will be described with reference to FIG. 4. FIG. 4 is an explanatory diagram for illustrating a flow of a processing performed in the printer image processing unit 4615.

A background removing processing unit 4901 of the printer image processing unit 4615 uses the histogram generated by a scanner image processing unit 312 to perform a processing of clearing (eliminating) the background color of the image data. A monochrome generation unit 4902 converts the color data into the monochrome data. A Log conversion unit 4903 performs a luminance density conversion. The Log conversion unit 4903 converts, for example, the input image data based on RGB into the image data based on CMY. An output color correction unit 4904 performs an output color correction. For example, the output color correction unit 4904 uses the table or the matrix to convert the input image data based on CMY into the image data based on CMYK. An output-side gamma correction unit 4905 performs a correction so that a signal value input to the output-side gamma correction unit 4905 is proportional to a reflected density value after the copy output. An encoded image combining unit 4907 combines a background image data generated by a meta information image generation unit which will be described below with the (original) image data. A halftone correction unit 4906 performs a halftone processing in accordance with the number of output tones of the printer unit. For example, binarization, conversion into 32 gradations, or the like is performed on the image data of the high tones.

It is noted that in the respective processing units in the scanner image processing unit 4612 or the printer image processing unit 4615, such a configuration is adopted that the received image data can be output without performing the respective processings. In this manner, passing data without performing the processing in the processing unit is represented by "passing through the processing unit" below.

It is noted that as image processings involving loss of information on a restriction item embedded from the computerized data obtained by reading the original where the restriction item such as copy restriction which will be described below is embedded, the following processings exist.

For example, the first processing corresponds to a case where the a filtering processing for smoothing the image is performed at such a level that it is difficult to read out small dots by the filter processing unit 4802.

The second processing corresponds to a case where the background removing processing at such a level that the small dots disappear is performed by the background removing processing unit 4901 (illustrated in FIG. 4).

The third processing corresponds to a case where a changing processing for a scaling factor (in particular, a zooming processing for reduction) or the resolution conversion processing at such a level that the small dots disappear is performed.

The fourth processing corresponds to a case where a color conversion processing such that colors of the small dots are changed is performed.

Next, in this network system, as an information leakage measure, a processing for instructing an instruction of embedding the information on the restriction item for tacking the copy restriction or print output and an operation of the present system for restricting the copy will be described. It is noted that hereinafter, the client PC 4011 will be described as an example but the embodiment may be applied to the client PC 4012. Also, the image forming apparatus 4031 will be described as an example but the embodiment may be applied to the image forming apparatus 4032.

For example, when the client PC 4011 is operated, the user instructs that the information on the restriction item for the copy restriction or the print output tacking is embedded to the print output.

After that, the image forming apparatus 4031 embeds the information on the restriction item for the copy restriction or the print output tacking as the background image to the print output which is to be generated. It is noted that the print output containing the back ground image to which the information on the restriction item is embedded by utilizing LVBC (Low Visibility Barcode) (a detail of which will be described) is as exemplified as FIG. 5.

Figure 5:
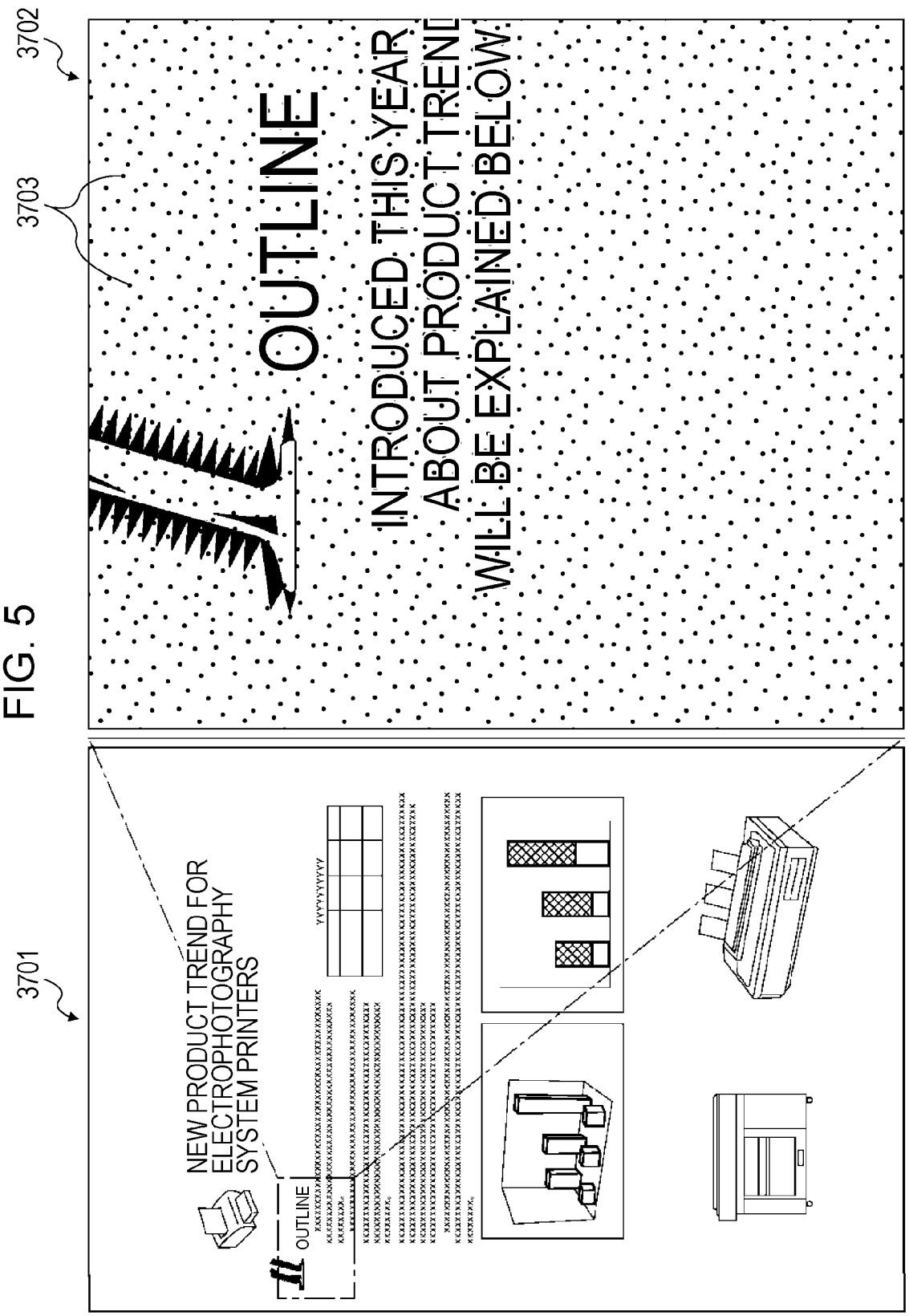
FIG. 5 is an image diagram of an example of an original in which LVBC is embedded.

Even when the user attempts to copy the original containing the copy restriction information exemplified in FIG. 5 by using the image forming apparatus 4031, the image forming apparatus 4031 detects that the original contains the copy restriction information, and the copy operation is aborted.

Next, a specific operation for instructing an embedding of the copy control information or the information on the restriction item which is the tracking information in the present system while the user operates the client PC 4011 will be described with reference to FIG. 7.

Figure 7:
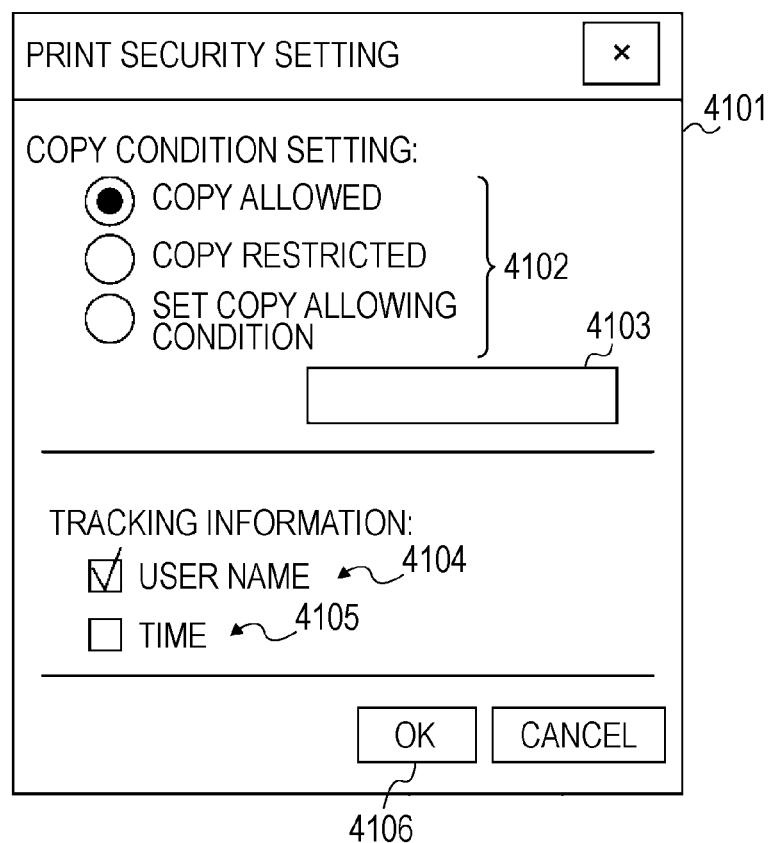
FIG. 7 is an explanatory diagram for exemplifying a screen of a print security setting diagram in a printer driver in a client PC.

FIG. 7 is an explanatory diagram for exemplifying a screen of print security setting dialog of the printer driver in the client PC 4011 or 4012. The user operates on this dialog to perform a setting operation on a security setting desired to be embedded to the print output.

As illustrated in FIG. 7, a print security setting dialog 4101 is divided into two parts. The upper half corresponds to a setting part for the copy restriction, and the lower half corresponds to a setting part for the tracking information.

First, the setting part for the copy restriction in the upper half will be described. In the print security setting dialog 4101, as the user operates a radio button 4102, one setting is selected among a setting for allowing the copy, a setting for regularly restricting the copy, and a setting for cancelling the copy restriction by way of a password input. At this time, in a case where the third option "cancelling the copy restriction by way of the password input" is selected, a password can be input in a password input field 4103. With this configuration, the user can input the password in the password input field 4103 for cancelling the copy restriction.

Next, the setting part for the tracking information in the print security setting dialog 4101 in the lower half will be described. In the print security setting dialog 4101 illustrated in FIG. 7, two check boxes 4104 and 4105 are arranged. While the user checks the check boxes, it is possible to instruct the embedding of the user name or the time information, respectively.

The various pieces of setting information instructed by the user in the above-described manner are stored in a job restriction information holding unit (storing unit) (not shown) of the client PC 4011 as the user presses an OK button 4106. It is noted that the above-described processing for embedding copy control information or the information on the restriction item which is the tracking information may be performed on the image forming apparatus 4031 or 4032 side. That is, when the image forming apparatus 4031 performs the copying of the paper original, the image forming apparatus 4031 may be configured to perform the print output in a state where the copy restriction information is contained in the background.

Next, the copy restriction operation in the image forming apparatus 4031 will be described. It is noted that the image forming apparatus 4031 holds previously set conditions for aborting the copy operation (the date and time, and the user authentication information) and the like in the HDD 4604.

In the image forming apparatus 4031, when the user places the original containing the copy restriction information on the scanner unit and operates the operation unit 4512 (illustrated in FIG. 2) to instruct the copy start, the copy operation is started. The controller 4511 of the image forming apparatus 4031 controls the scanner unit 4513, the scanner I/F 4611, the scanner image processing unit 4612, and the compression unit 4613 to read the original image and sends the image data to the image conversion unit 4617 and also to an image analysis unit. It is noted that in the image processing apparatus according to the present embodiment, the processing of the image analysis unit (embedded information analysis unit) is executed by the CPU 4601. A program for the CPU 4601 to execute a program for performing the image analysis is stored in the HDD 4604 or the ROM 4603.

The image forming apparatus 4031 is provided with as an image reading unit having a scanner unit as the image data input unit. It is noted that the image data input unit of the image forming apparatus 4031 may be configured to input the image data containing the information on the restriction item for tracking the copy restriction or the print output read from the original, from the external apparatus or the storage medium.

This image analysis unit controls the decoding unit 4808 to take out the copy restriction information or the print output contained in the information on the restriction item for tracking the image data received from the image reading unit. The image analysis unit sends the taken out copy restriction information to a job control determination unit. According to the present embodiment, the processing of the job control determination unit is executed by the CPU 4601, and a program for the CPU 4601 to perform the processing of the job control determination unit is stored in the HDD 4604 or the ROM 4603.

The job control determination unit compares the copy restriction information received from the image analysis unit with the copy restriction conditions stored in the HDD 4604 to determine whether the copy operation is to be aborted. At this time, in a case where the job control determination unit determines that the copy operation is to be aborted, the job control determination unit controls the image forming apparatus 4031 so that the copy operation is aborted. Furthermore, the job control determination unit controls the operation unit I/F 4605 to display a message illustrated in FIG. 8 or 9 on the operation unit 4512. The printer unit 4514 prints the image data received from the printer image processing unit 4615 on the paper to generate the print output (print). At this time, in a case where the printer unit 4514 receives a command of aborting the operation from the job control determination unit, the printer unit 4514 aborts the print operation even during the mid-course of the job.

Figure 8:
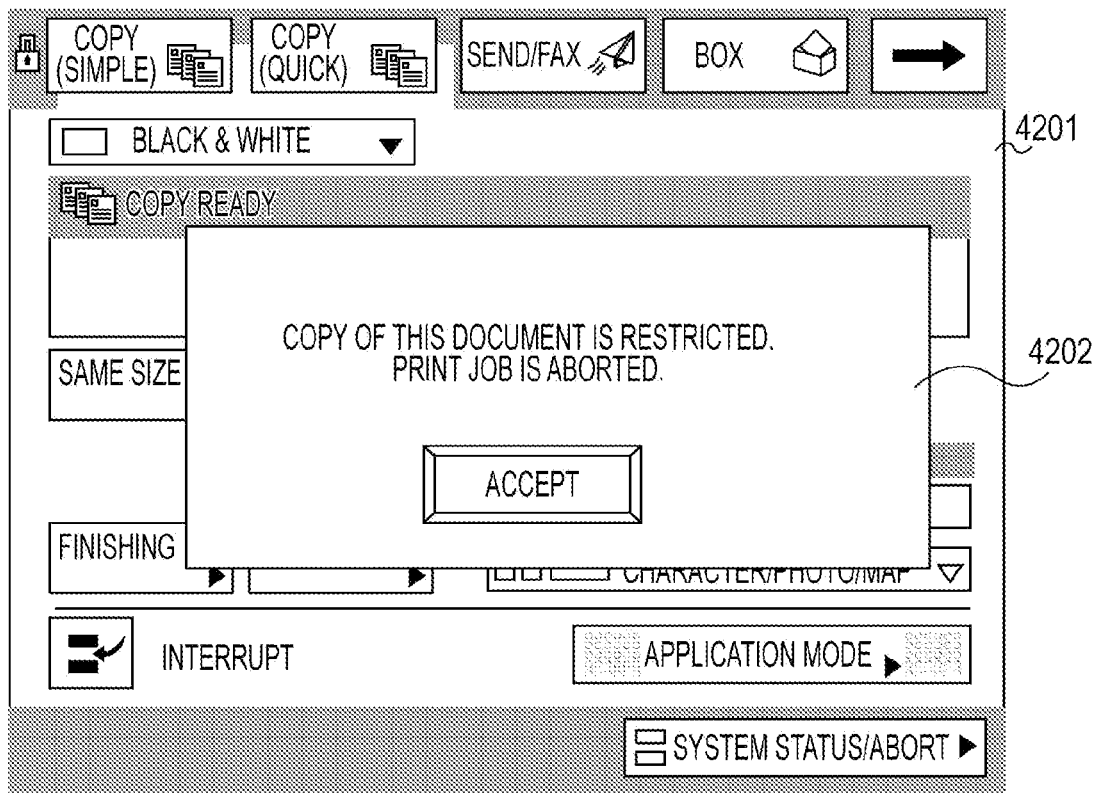
FIG. 8 is an explanatory diagram for exemplifying a screen of a message diagram mentioning that a copy operation displayed on an operation screen of the image forming apparatus is aborted.

At this time, a case where the message illustrated in FIG. 8 is displayed on the operation screen corresponds to the case where the copy restriction information indicating "regularly restricting the copy" is embedded to the original among the above-described three copy restriction settings. In this case, a message dialog 4202 mentioning that the copy operation is aborted is displayed on the operation screen 4201 of the image forming apparatus 4031.

Figure 9:
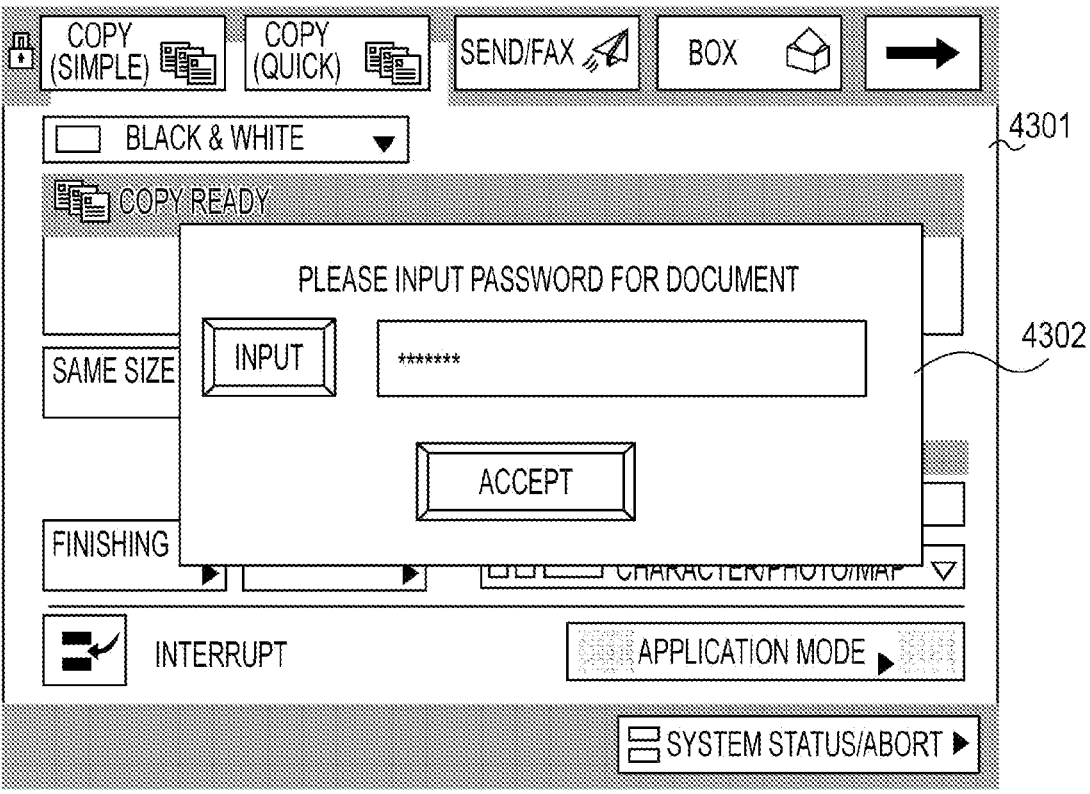
FIG. 9 is an explanatory diagram for exemplifying a screen of a diagram for urging a password input after the copy operation displayed on the operation screen of the image forming apparatus is interrupted.

In addition, a case where the copy restriction information indicating "cancelling the copy restriction by way of the password input" is embedded to the original, the message illustrated in FIG. 9 is displayed on the screen of the operation unit 4512. In this case, the image forming apparatus 4031 temporarily stops the copy operation and displays a dialog 4302 for urging the password input on the operation screen 4301.

In view of the above, the user uses a soft keyboard, an IC card (not shown), or the like to input the password to the image forming apparatus 4031. After that, the image forming apparatus 4031 determines whether the password contained in the background of the original is matched with the input password. In a case where the passwords are matched with each other, the image forming apparatus 4031 closes the dialog to continue the copy operation. On the other hand, in a case where the password input is failed, the copy operation is aborted.

Next, the client PC 4011 and a server PC 4021 will be described. Although not shown, these PCs are provided with a CPU (control unit) for executing software stored in a ROM or a large-scale storage apparatus such as hard disk. The CPU controls the respective devices connected to the system bus in an overall manner.

The client PC 4011 or the server PC 4021 is provided with an input apparatus such as a keyboard to be operated by the user for inputting an instruction and a display module composed of a liquid crystal display or the like.

The client PC 4011 and the server PC 4021 bi-directionally exchanges data by respectively using network interface cards (NIC) via the LAN with other apparatuses.

Next, the generation operation for the print output containing the copy restriction information or the tracking information will be described through sorting out into a method of generating the background image of the print output on the client PC side and a method of generating the background image of the print output on the image formation apparatus side.

First, the method of generating the background image of the print output on the client PC side will be described. It is noted that the determination and the execution are performed by the CPU of the client PC 4011 in the following explanation, which however may be replaced by the client PC 4012.

Although not shown, in the client PC 4011, as the user performs the print instruction operation, a print data generation unit is activated. A processing of the print data generation unit is executed by a CPU (not shown) of the client PC 4011. This print data generation unit converts the document whose print is instructed by the user into a bundle of drawing commands to the image formation apparatus. To be more specific, for example, this operation is realized by generating PDL (Page Description Language). The print data generation unit sends the thus generated print data to an image combination unit.

On the other hand, the job restriction information holding unit sends the job restriction information the user which is held as the result of operating the above-described security setting dialog by the user to a meta information image generation unit.

In the meta information image generation unit, on the basis of the job restriction information received from the job restriction information holding unit, the background image containing the copy restriction information or the tracking information is generated. As a method of generating this background image, for example, a method of using the LVBC (Low Visibility Barcode) exists. The LVBC will be described below. The meta information image generation unit sends the thus generated background image to the image combination unit. According to the present embodiment, the configuration of the job restriction information holding unit is realized by of an HDD (not shown) of the client PC.

The image combination unit combines the print data received from the print data generation unit with the background image received from the meta information image generation unit to generate a command to the image formation apparatus so that the background image is input to the respective pages of the print data. To be more specific, for example, a unit adopted to embed the background image to PDL as overlay form information or the like exists. The image combination unit sends the combined print data to a data sending unit. The data sending unit controls the network interface to send the combined print data to the print server or the image forming apparatus 4031. According to the present embodiment, the processing performed by the meta information image generation unit, the processing performed by the image combination unit, and the processing performed by the data sending unit are executed under the control of the CPU (not shown) of the client PC 4011.

Next, the action on the image formation apparatus side will be described. The network interface 4606 of the image forming apparatus 4031 stands by to receive data from the LAN 4001. The CPU 4601 detects that data is sent from other node on the LAN 4001 to the network interface 4606, and the received data is transferred to an appropriate subsystem depending on the data type. The identification of the data type is performed, for example, on the basis of a port number in general in a case where the communication system is TCP/IP. Herein, the received data is the print data containing the print command to the image formation apparatus. A data reception unit identifies that the received data is the print data, and then transfers the data to a data analysis unit. According to the present embodiment, a processing of the data analysis unit is executed by the CPU 4601.

The data analysis unit takes out the drawing commands (PDL) from the data received from the data reception unit and analyzes the data to generate intermediate data internally used by the image formation apparatus. The data analysis unit sequentially sends the thus generated intermediate data to the RIP 4628.

The RIP 4628 converts the intermediate data received from the data analysis unit into bitmap images. After the compression unit 4629 compresses the bitmap images, the compression unit 4629 sequentially sends the bitmap images to the expansion unit 4616. The printer unit 4514 performs the printing on the paper on the basis of the bitmap images received via the expansion unit 4616, the printer image processing unit 4615, and the printer I/F 4614.

Next, the generation operation for the print output containing the copy restriction information or the tracking information and the method of generating the background image of the print output on the image formation apparatus side will be described.

In this case, although not shown, on the client PC side, as the user performs the print instruction operation, a print data generation unit is activated. An operation of the print data generation unit is similar to that of the above-described print data generation unit, and therefore a description thereof will be omitted. This print data generation unit sends the thus generated print data a data sending unit. On the other hand, the job restriction information holding unit sends the job restriction information which is held as the result the above-described security setting dialog operated by the user to the data sending unit.

A data sending unit 5102 collects up the print data received from the print data generation unit and the job restriction information received from the job restriction information holding unit into one to be constructed as the print instruction data to the image forming apparatus 4031. The print instruction data constructed in this manner is sent by the data sending unit via the network interface to the print server 4021 or the image forming apparatus 4031.

Next, the action at this time on the image forming apparatus 4031 side will be described. The operation of the data reception unit in the image forming apparatus 4031 is similar to that of the data reception unit in the above-described method of generating the background image of the print output on the client PC side, and therefore a description thereof will be omitted.

The data generated in the data reception unit is sent to the data analysis unit. The data analysis unit takes out the job restriction information and the drawing commands (PDL) respectively from the data received from the data reception unit. The data analysis unit sends the taken out job restriction information to the meta information image generation unit. According to the present embodiment, the processing of the meta information image generation unit is performed by the RIP 4628. On the other hand, the operation of processing the drawing commands taken out by the data analysis unit is similar to that of the data analysis unit in the above-described method of generating the background image of the print output on the client PC side, and therefore a description thereof will be omitted. It is noted that the thus generated bitmap is sent by the RIP 4628 to an encoded image combining unit 4907.

The meta information image generation unit analyzes the job restriction information received from the data analysis unit, embeds the information to the image, for example, by using the technology such as the LVBC, and generates the background image in accordance with the job restriction information. The meta information image generation unit sends the thus generated background image to the encoded image combining unit 4907.

The encoded image combining unit 4907 combines a bitmap received from an image generation unit with the background image received from the meta information image generation unit and sends the bitmap obtained as the result of the combination to a print unit. The print unit controls an expansion unit, a printer image processing unit, a printer I/F, and the printer unit to print the bitmap image received from the image generation unit on the paper.

Next, in the image formation apparatus of this network system, the LVBC (Low Visibility Barcodes) which is suitable to be used as embedding means for the restriction item will be described.

FIG. 5 is an image diagram of an example of the original to which the LVBC is embedded. In FIG. 5, reference numeral 3701 denotes an entire sheet and reference numeral 3702 denotes a part of the sheet 3701 in an expanded manner. As illustrated in the expanded part of the sheet 3702, in addition to the image to be originally drawn, a large number of dots (for example, 3703) apparently randomly embedded are formed in the original. The LVBC utilizes these dots for embedding the information that should be added. According to the present embodiment, the information indicating the copy restriction or the tracking information is embedded. This tracking information includes an individual name and an organization name of the user who has created the original, a machine number of the apparatus which has perform the image formation, an IP (Internet Protocol) address, a MAC (Media Access Control) address. Furthermore, the tracking information may be a setup location, print time and date with which the print time can be identified, or a print time of data.

Next, the LVBC embedding method will be described. In this LVBC, a dot pattern called grid is printed on the sheet for embedding the additional information in addition to the image to be printed.

Figure 6:
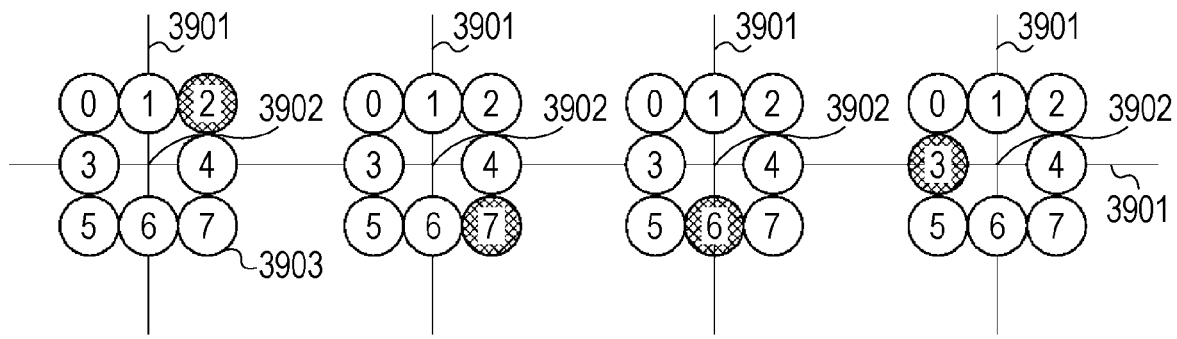
FIG. 6 is an explanatory diagram for explaining an example of embedding binary data as additional information.

FIG. 6 is an explanatory diagram for describing an example of embedding binary data of as the additional information. In FIG. 6, vertical and horizontal lines 3901 represent virtual guide lines indicating positions of the grid. When the shortest distances are linked by lines in this way, the grid pattern is appeared. Reference numeral 3902 denotes a center point (center position), where no dot is placed. In actuality, for example, like 3903, dots are arranged at positions away from the center point 3902 while being displaced (unevenly distributed).

In this example, the binary data 010111110011b is decomposed into 3 bits each, that is, 010, 111, 110, and 011. Furthermore, a decimal conversion is performed on each of the 3 bits to be converted into 2, 7, 6, and 3. As illustrated in FIG. 6 on the lower side, the respective dots constituting the grid represent information while displacing the dots in one of the eight directions in up, down, left, and right with respect to the numeral values. In this case, the information pieces of 2, 7, 6, and 3 are embedded while displacing the dots in upper right, lower right, down, and left, respectively. By repeatedly performing such a processing, in the LVBC, it is possible to embed the additional information of about 2000 bytes to the sheet. Furthermore, it is possible to improve the reliability against the misrecognition to be taken as the image representation or the dirt, crease, partial destruction of the sheet by increasing the redundancy through repeatedly embedding the dots which represent the additional information again and again to the sheet.

It is noted that for analyzing the LVBC, it is necessary to investigate the position of the grid with precision, and it is therefore desired to set the displacement of the dots in the eight directions appearing in an equal probability. However, there are cases that a large number of pieces of particular data such as 0 are embedded to the embedded data, and the equal probability may not be obtained without employing a measure. In view of the above, according to the present embodiment, a scramble processing having the reversibility with respect to the embedded information (for example, a common key cipher processing) is applied to randomize the displacement of the dots for performing the embedding.

Next, the LVBC analysis method (for example, a method of performing the analysis in the image analysis unit) will be described. Although not shown, for the LVBC analysis, a dot detection unit extracts arbitrary dots from the image representation to which the additional information is embedded (the original image and the additional information are mixed) to be converted into a coordinate. Next, a dot analysis unit removes unnecessary dotes such as dots constituting the half tone from the dots detected by the dot detection unit. A plurality of absolute coordinates of the dots which are the output result of the analysis performed by this dot analysis unit are stored in an absolute coordinate list storage unit.

Next, a dot conversion unit detects the rotation angles and the grid intervals from the lists of the absolute coordinates stored by the absolute coordinate list storage unit to be converted into the relative coordinates from the grid positions. The plurality of relative coordinates of the dots from the grid positions analyzed by this dot conversion unit are recorded in the relative coordinate list storage unit.

Next, in a network system provided with the image processing apparatus according to the present embodiment, when the image data is stored in the apparatus, a procedure for holding the coded information such as the restriction item for the security will be described with reference to FIG. 10.

Figure 10:
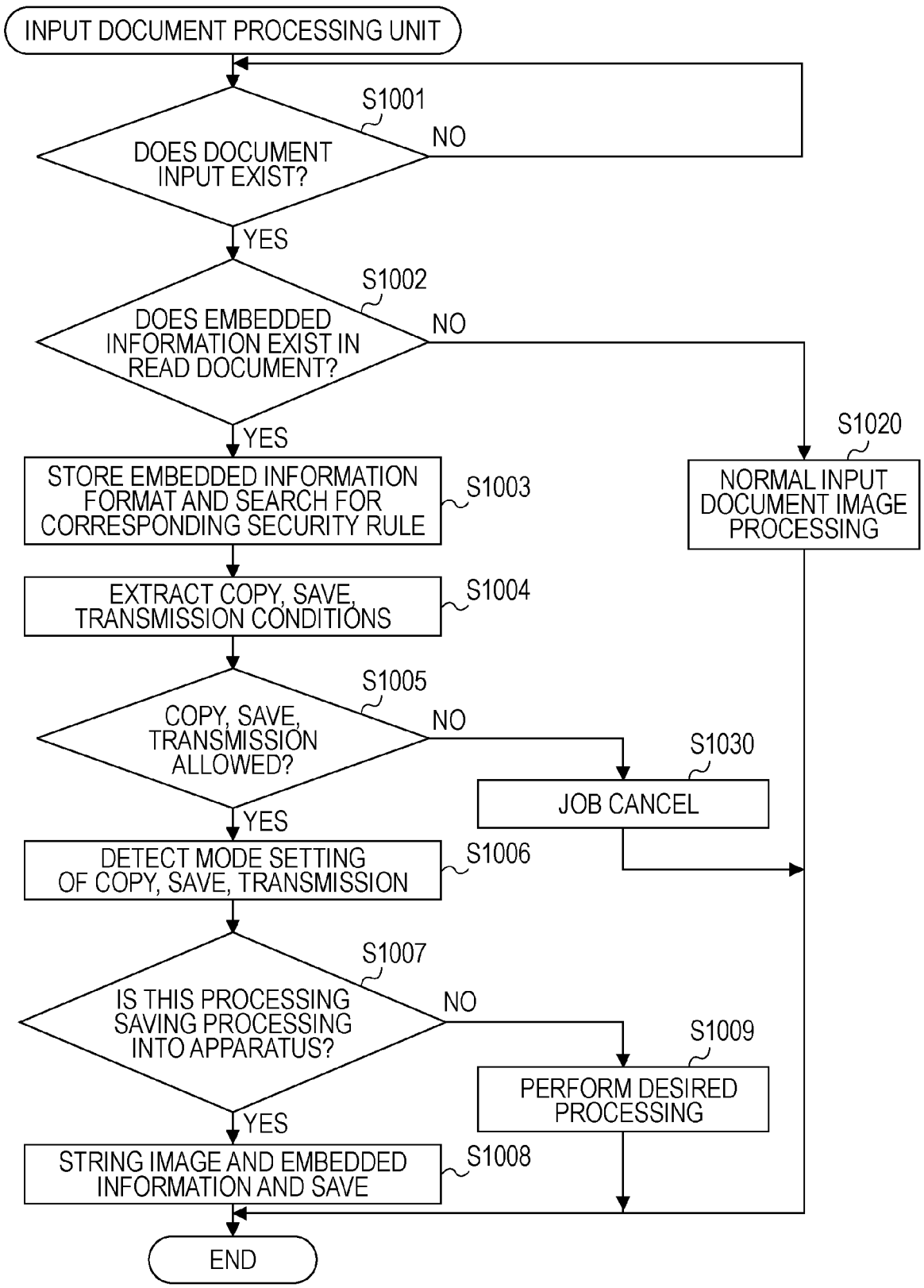
FIG. 10 is a flowchart showing a procedure of a processing for holding coded information in image data.

FIG. 10 is a flowchart for describing the procedure of the processing for holding the coded information in the image data. This flowchart is executed on the basis of the processing performed by the CPU 4601 of the image forming apparatus 4031.

In this input original processing for holding the coded information in the image data, the processing stands by until the input operation of the original is generated (NO in step S1001).

Then, the image of the original read by the scanner unit 4513 through the input operation of the original is output to the image analysis unit and the image conversion unit 4617 (YES in step S1001).

Next, the image analysis unit determines whether the embedded information exists in the read original (step S1002). At this time, in a case where the embedded information analysis unit determines that the embedded information exists in the read original (YES in step S1002), the embedding format of the information to a storage unit (a HDD 4604) is discriminated. Furthermore, a corresponding security rule previously stored in the HDD 4604 is searched for (step S1003). For the security rule, depending on the embedding format of the information embedded to the original, types of the image processings to be restricted or restricted or types of the image processings to be permitted are defined. According to the present embodiment, as an example of the security rule, for example, the following setting is performed. When the type of the embedding is the LVBC, the zooming processing at a scaling factor between 90% and 110% is permitted, but a scaling factor other than the above is restricted. Also, a background removing processing is restricted, and a filter processing based on a low-pass filter is restricted too. Also, when the type of the embedding is a QR code, the color conversion processing is restricted, and a scaling factor equal to or lower than 50% is restricted. Other than the above-described example, various security rules are regulated in accordance with other embedding formats. With this security rule, it is possible to prevent the loss of the information embedded to the original. In step S1003, from the identified embedding format, the CPU 4601 can recognize which type of the image processing is restricted or which type of the image processing is permitted.

Then, from the information embedded to the original, the processing contents of the copy, save, transmission conditions and the like (for example, information such as "the copy restriction" and "the sending processing is restricted") are extracted (step S1004).

Next, the job currently executed in the image formation apparatus is compared with the copy, save, transmission conditions and the like extracted in step S1004 to determine whether the execution of the currently executed job is restricted (for example, the copy restriction or the like) (step S1005).

In a case where the execution of the job is permitted (YES in step S1005), the content of the operation instruction set by the user with the operation unit 4512 is detected (step S1006).

Next, it is determined whether the detected content of the operation instruction from the user is the processing of saving in the apparatus (step S1007). As a result of this determination, it is determined that the content is the saving processing (YES in step S1007), such a processing is performed that the original image information which is the information on the image of the original part in the image data is stringed to the embedded information to be saved in the HDD 4604. This processing corresponds to such a processing that the image data read by a scan unit is stringed to the analysis information read by the scan unit and extracted by the embedded information analysis unit (the image analysis unit) to be saved in the HDD 4604 in the apparatus (step S1008).

Next, as a result of the determination in step S1002, in a case where the embedded information analysis unit determines that the embedded information does not exist in the read original (NO in step S1002), the image processing with respect to the normal input original is executed (step S1020).

Next, as a result of the determination in step S1005, in a case where the currently executed job is restricted (NO in step S1005), the job is cancelled (step S1030), and this processing is ended. Next, as a result of the determination in step S1007, in a case where this content is not the processing of saving in the apparatus (NO in step S1007), the job is cancelled (step S1009), and this processing is ended.

According to the flowchart of FIG. 10, the content of the embedded information is recognized, and the restricted job is cancelled, so that it is possible to maintain the security of the image which is the job execution target. Also, in a case where the read image is saved in the storage apparatus of the image formation apparatus, the image data to be saved is stringed to the content of the embedded information and saved. In such a case, also in a case where the image data is reutilized (the print output or the sending processing) later, the embedded information can be continuously held in the image data.

Next, a procedure for the image processing apparatus according to the present embodiment to execute the job on the basis of the image having the stored embedded information stringed to the original image information will be described with reference to FIG. 11.

FIG. 11 is a flowchart for exemplifying the procedure of executing the job on the basis of the image data where the image information is stringed to the coded information such as the restriction item for the security. This flowchart is executed on the basis of the processing performed by the CPU 4601 of the image forming apparatus 4031.

First, the processing stands by until the user accepts the input of a job execution instruction for the image forming apparatus 4031 (NO in step S3001). When the user accepts the job execution instruction for the image forming apparatus 4031 from the operation unit 4512 or the client PC 4011, the processing operation is started (YES in step S3001).

Next, when the user inputs an instruction for specifying the image data which is the job execution target, the controller 4511 of the image formation apparatus identifies the image data from the images saved in the HDD 4604 (step S3002).

Next, the controller 4511 determines whether the restriction information is stringed to the selected image information as the embedded information (step S3003). In a case where it is determined that the restriction information exists (YES in step S3003), the processing advances to step S3004, and it is determined whether the job is an execution. The determination in step S3004 is performed depending on whether the restriction information which is the embedded information restricts the execution of the job accepted in step S3001. In the case of the job which is not restricted, the flow advances to step S3005. On the other hand, in the case of the job which is restricted, the flow advances to step S3012. Then, the job is cancelled, and this flowchart is ended.

In step S3005, a format of the image data used for the job whose execution is specified by the user is detected. For example, in the case of the instruction of the job using the send function, the format is identified by the format of the image data set by the user (for example, which may be PDF or TIFF). Also, in a case where the job whose execution is instructed by the user is the copying, the image data itself is not output, but the print output is performed after the conversion into the bitmap format, and thus the output is regarded as the bitmap format.

Next, it is determined whether the format of the image data identified in step S3005 is a type in which the embedded information can be added as an attribute (step S3006). For example, like the PDF or the TIFF, when the format allows the addition of the attribute information as well as the image data, without embedding the restriction information which is the embedded information as the image, it is possible to perform the addition as the attribute information of the image data. In the case of the image data in such a format, the determination in step S3006 is YES. On the other hand, like the bitmap image or JBIG, when the format does not allow the addition of the attribute information, the determination in step S3006 is NO, the processing advances to step S3010.

At this time, in a case where the image data style is of a type of embedding a security policy (YES in step S3006), the information on the restriction item is added as the attribute information so that the image data takes over the restriction information which is the embedded information (step S3007).

For example, the controller 4511 is provided with a conversion unit adopted to convert the image data into a desired image format from a previously prepared single or plural types of image formats. Furthermore, while following the specification of the user, with the conversion unit, the controller 4511 is configured to be able to perform the conversion into a desired image format corresponding to the format of the sending data of a type in which the security policy can be embedded. Together with this, the controller 4511 is provided with a function of holding the information on the restriction item as the attribute information other than the image in the desired image format (the image format of a type in which the information can be held as the attribute information of the image data).

The controller 4511 configured in the above-described manner holds the information on the restriction item in the image data of the type in which the restriction information can be embedded as the attribute information other than the image in step S3007 described above.

Next, the controller 4511 does not restrict the image processing on the image data to which the information on the restriction item is added. Then, as occasion demands, after the image processing is applied on the image data, the controller 4511 of the image processing apparatus executes the job on the image data to which this information on the restriction item is added (step S3008), and this processing is ended.

Next, as a result of the determination in step S3003, in a case where it is determined that the restriction information is not stringed (NO in step S3003), the instructed job is executed, the normal data sending processing is performed (step S3008), and this processing is ended.

Next, as a result of the determination in step S3006, in a case where it is determined that the sending data style is not a type in which the security policy can be embedded (NO in step S3006), the processing advances to step S3010.

In step S3010, the image processing is restricted on the basis of the security rule. At this time, the security rule corresponds to the security rule decided in step S1003 in the flowchart of FIG. 10. Then, in step S3011, it is determined whether the job whose execution is instructed by the user is an executable job in which the image processing restricted in step S3010 may be not executed. When the job is executable (YES in step S3011), the processing advances to step S3008, and the job is executed. Herein, as the job is executed in a range of the image processing restricted in step S3010, it is possible to execute the job without involving the loss of the restriction information embedded to the image data. For example, when the executed job is a job of sending the image, the restriction information is embedded to the sent image data without the information loss. Also, when the executed job is a print job, the restriction information is embedded to the image after the print output without the information loss. Therefore, even in a case where the image after the print output is read by the scanner, it is possible to read out the restriction information.

On the other hand, in a case where it is determined that the job whose execution is instructed by the user cannot be normally executed unless the image processing restricted in step S3010 is executed (NO in step S3011), the job is cancelled, this flowchart is ended.

According to the flowchart of FIG. 11, in a case where the job is execution on the image data to which the restriction information is stringed, it is possible to avoid the loss of the restriction information due to the job execution. Also, in a case where the job cannot be executed without involving the loss of the restriction information, the job is cancelled. With this configuration, it is possible to prevent the output of the image data or image involving the loss of the restriction information.

It is noted that the case of outputting the computerized data of the document from the image processing apparatus to the outside also includes a case of outputting the computerized data of the document from the image processing apparatus to an external recording medium or storage medium (a USB memory, or the like).

In addition, according to the embodiment of the present invention, the electronic image data is stored which is obtained as the image processing apparatus reads the original to which the restriction item such as the copy restriction is embedded. The image processing apparatus determines whether the restriction item such as the copy restriction is embedded to the image data. In a case where it is determined that the restriction item such as the copy restriction is embedded to the stored image data, such a configuration may be adopted that all the image processings are restricted to maintain the state where the restriction item is embedded, and only the image data is output.

It is noted that the present invention is not limited to the above-described exemplary embodiments, and also the present invention can be appropriately modified without departing from the gist of the present invention.

In addition, the embodiments of the present invention can be achieved by executing the following processing. That is, a storage medium on which a program code (computer program) of software which realizes the functions of the above-described embodiments is supplied to a system or an apparatus. Then, the program code stored on the storage medium is read out and the processing is executed by a computer (or a CPU, an MPU, or the like) of the system or the apparatus, thereby achieving the functions of the above-described embodiments of the present invention.

In this case, the program code itself read out from the storage medium realizes the functions of the above-described embodiments, and the computer-readable storage medium on which the program code is stored constitutes the present invention. In addition, according to the embodiment of the present invention, such a configuration may be adopted that a part or all of the actual process is performed by the OS (operation system) the like which is running on the computer on the basis of the instruction of the program code and the functions of the above-described embodiments may be realized by the processing. Furthermore, according to the embodiment of the present invention, such a configuration may be adopted that the program code read from the storage medium written in a memory that is provided to a function expansion board inserted in the computer or a function expansion unit connected to the computer. After that, on the basis of the instruction of the program code, a CPU or the like provided to the function expansion board or the function expansion unit may perform a part or all of the actual process. It is noted that as the storage medium for supplying the program code, the following products can be used. For example, a flexible disk, a hard disk drive, an opto-magnetic disk, a CD-ROM, a CD-R, a CD-RW, a DVD-ROM, a DVD-RAM, a DVD-RW, a DVD+RW, a magnetic tape, a non-volatile memory card, a ROM, and the like can be used. In addition, the program code may be downloaded via the network.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-048098 filed Feb. 28, 2008, which is hereby incorporated by reference herein in its entirety.

What is claimed is:

1. An image processing apparatus including at least one processor and memory communicatively-coupled via a bus, comprising:
   an image input unit configured to input image data;
   an image processing unit configured to perform an image processing on the image data;
   a detection unit configured to detect embedded information from the image data;
   a restriction unit configured to restrict an execution of an image processing involving a loss of the embedded information from the image data to be performed by the image processing unit in a case where the detection unit detects the embedded information from the image data; and
   a determining unit configured to determine whether information indicating the embedded information is able to be added to image data on which the image processing involving a loss of the embedded information has been performed,
   wherein in a case where the determining unit determines that information indicating the embedded information is able to be added to image data on which the image processing involving a loss of the embedded information has been performed, the restriction unit does not restrict the execution of the image processing involving the loss of the embedded information.

2. The image processing apparatus according to claim 1, wherein in a case where the detection unit does not detect the embedded information from the image data, the restriction unit does not restrict the execution of the image processing on the image data to be performed by the image processing unit.

3. The image processing apparatus according to claim 1, wherein the image processing involving the loss of the embedded information from the image data is one of a resolution conversion processing, a zooming processing, a filter processing, a background removing processing, and a color conversion processing.

4. The image processing apparatus according to claim 1, further comprising:
a transmission unit configured to transmit image data to which the information indicating the embedded information has been added, to an external apparatus.

5. The image processing apparatus according to claim 1, wherein in a case where the determining unit determines that information indicating the embedded information is not able to be added to image data on which the image processing involving a loss of the embedded information has been performed, the restriction unit restricts the execution of the image processing involving the loss of the embedded information.

6. The image processing apparatus according to claim 1, further comprising:
a reading unit configured to read a document,
wherein the image input unit inputs image data generated based on the document read by the reading unit.

7. An image processing method in an image processing apparatus, the method comprising:
inputting image data;
detecting embedded information from the image data;
restricting an execution of an image processing involving the loss of embedded information from the image data in a case the where embedded information is detected from the image data; and
determining whether information indicating the embedded information is able to be added to image data on which the image processing involving a loss of the embedded information has been performed,
wherein in a case where it is determined that information indicating the embedded information is able to be added to image data on which the image processing involving a loss of the embedded information has been performed, the execution of the image processing involving the loss of the embedded information is not restricted.

8. A non-transitory computer-readable medium storing a computer-executable process, the computer executable process causing a computer to execute an image processing method in an image processing apparatus, comprising:
inputting image data;
detecting embedded information from the image data; and
restricting an execution of an image processing involving the loss of embedded information from the image data in a case the where embedded information is detected from the image data; and
determining whether information indicating the embedded information is able to be added to image data on which the image processing involving a loss of the embedded information has been performed,
wherein in a case where it is determined that information indicating the embedded information is able to be added to image data on which the image processing involving a loss of the embedded information has been performed, the execution of the image processing involving the loss of the embedded information is not restricted.

9. An image processing apparatus including at least one processor and memory communicatively-coupled via a bus, comprising:
an image input unit configured to input image data;
a detection unit configured to detect embedded information from the image data;
a conversion unit configured to convert the image data into a data format specified by a user; and
a determining unit configured to, in a case where the detection unit detects the embedded information from the image data, determine whether or not to restrict an execution of, on the image data, image processing involving a loss of the embedded information from the image data, based on a type of the data format specified by the user.

10. The image processing apparatus according to claim 9, wherein the determining unit determines that the execution of the image processing involving a loss of the embedded information is not restricted in a case where the data format specified by the user is a specific type of data format, and the determining unit determines that the execution of the image processing involving a loss of the embedded information is restricted in a case where the data format specified by the user is not the specific type of data format.

11. The image processing apparatus according to claim 10, wherein the specific type of data format is PDF or TIFF.

12. The image processing apparatus according to claim 10, wherein in a case where the data format specified by the user is the specific type of data format, information indicating the embedded information is added to image data of which the data format has been converted by the conversion unit.

13. The image processing apparatus according to claim 12, further comprising:
a transmission unit configured to transmit the image data to which the information indicating the embedded information has been added, to an external apparatus.

14. The image processing apparatus according to claim 9, wherein the image processing involving the loss of the embedded information from the image data is one of a resolution conversion processing, a zooming processing, a filter processing, a background removing processing, and a color conversion processing.

15. The image processing apparatus according to claim 9, further comprising:
a reading unit configured to read a document,
wherein the image input unit inputs image data generated based on the document read by the reading unit.

16. A method for controlling an image processing apparatus, comprising:
inputting image data;
detecting embedded information from the image data;
converting the image data into a data format specified by a user; and
determining, in a case where the embedded information from the image data is detected, whether or not to restrict an execution of, on the image data, image processing involving a loss of the embedded information from the image data, based on a type of the data format specified by the user.

17. A non-transitory computer-readable storage medium storing a computer-executable process for controlling an image processing apparatus, comprising:
inputting image data;
detecting embedded information from the image data;
converting the image data into a data format specified by a user; and
determining, in a case where the embedded information from the image data is detected, whether or not to restrict an execution of, on the image data, image processing involving a loss of the embedded information from the image data, based on a type of the data format specified by the user.

* * * * *